(12) United States Patent
Aya et al.

(10) Patent No.: US 10,152,412 B2
(45) Date of Patent: Dec. 11, 2018

(54) SMART FLASH CACHE LOGGER

(71) Applicant: Oracle International Corporation, Redwood Shores, CA (US)

(72) Inventors: Selcuk Aya, San Carlos, CA (US); Jia Shi, Burlingame, CA (US); Kothanda Umamageswaran, Sunnyvale, CA (US); Juan Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/794,107

(22) Filed: Jul. 8, 2015

(65) Prior Publication Data

US 2016/0085681 A1   Mar. 24, 2016

Related U.S. Application Data (60) Provisional application No. 62/054,262, filed on Sep. 23, 2014.

(51) Int. Cl.
*G06F 12/02* (2006.01)
*G06F 12/0804* (2016.01)
*G06F 12/0871* (2016.01)

(52) U.S. Cl.
CPC ...... *G06F 12/0246* (2013.01); *G06F 12/0804* (2013.01); *G06F 12/0871* (2013.01);
(Continued)

(58) Field of Classification Search
CPC ............. G06F 12/0246; G06F 12/0804; G06F 12/0871; G06F 2212/7208
See application file for complete search history.

(56) References Cited

U.S. PATENT DOCUMENTS 4,885,680 A * 12/1989 Anthony ............. G06F 12/1045
711/120
5,584,002 A * 12/1996 Emma .................... G11C 29/88
711/118
(Continued)

OTHER PUBLICATIONS

Ping Zhou, Bo Zhao, Jun Yang, and Youtao Zhang. 2009. A durable and energy efficient main memory using phase change memory technology. In Proceedings of the 36th annual international symposium on Computer architecture (ISCA '09). ACM, New York, NY, USA, 14-23. DOI=http://dx.doi.org/10.1145/1555754. 1555759.*

(Continued)

*Primary Examiner* — Ramon A. Mercado
(74) *Attorney, Agent, or Firm* — Hickman Palermo Becker Bingham LLP (57) ABSTRACT

Techniques herein are for chaining nonvolatile storage devices to achieve high availability. A method involves a storage server receiving a write request to store data blocks in a first nonvolatile memory device. The storage server comprises a plurality of nonvolatile memory devices that cache data blocks stored on primary storage. The plurality of nonvolatile memory devices comprises the first nonvolatile memory device. The storage server maintains a cache index of data blocks that reside in the plurality of nonvolatile memory devices. Based on one or more criteria, the storage server reroutes the write request to a second nonvolatile memory device of the plurality of nonvolatile memory devices and stores an identifier of the second nonvolatile memory device in the cache index.

23 Claims, 5 Drawing Sheets

(52) U.S. Cl.
    CPC ............ *G06F 2212/1016* (2013.01); *G06F 2212/1024* (2013.01); *G06F 2212/7208* (2013.01)

(56) References Cited

U.S. PATENT DOCUMENTS

| | | | |
|---|---|---|---|
| 7,707,464 B2 * | 4/2010 | Gilgen | G06F 13/24 710/20 |
| 8,467,354 B1 * | 6/2013 | Jerkunica | H04L 65/1053 370/338 |
| 8,615,678 B1 * | 12/2013 | Madnani | G06F 11/1666 714/47.1 |
| 8,621,145 B1 | 12/2013 | Kimmel et al. | |
| 2010/0146239 A1 * | 6/2010 | Gabai | G06F 12/0246 711/202 |
| 2011/0066808 A1 * | 3/2011 | Flynn | G06F 12/0246 711/118 |
| 2011/0099320 A1 | 4/2011 | Lucas et al. | |
| 2015/0293854 A1 * | 10/2015 | Kalamatianos | G06F 12/121 714/723 |

OTHER PUBLICATIONS

Handy, Jim. The cache memory book. Morgan Kaufmann, 1998.*
Kim, Jesung, et al. "A space-efficient flash translation layer for CompactFlash systems." IEEE Transactions on Consumer Electronics 48.2 (2002): 366-375.*

* cited by examiner

SMART FLASH CACHE LOGGER

CROSS-REFERENCE TO RELATED APPLICATIONS; BENEFIT CLAIM

This application claims the benefit of U.S. Provisional Application No. 62/054,262 entitled Smart Flash Cache Logger, filed Sep. 23, 2014, the contents of which are incorporated by reference for all purposes as if fully set forth herein.

TECHNICAL FIELD

Embodiments relate generally to techniques for durably caching data. Specific techniques are included that use chaining across nonvolatile memory devices, such as flash modules, to achieve high availability.

BACKGROUND

A hybrid drive combines a solid state drive (SSD) and a hard disk drive (HDD) to achieve a storage device that can absorb a demand spike without significantly increasing storage costs. Typically the SSD and HDD are tightly coupled to achieve a seamlessly unified storage device.

Multiple hybrid drives are unaware of each other and do not collaborate to achieve load balancing. As such, a saturated SSD within a hybrid drive may become a bottleneck. The bottleneck may cause a storage manager to reroute storage activity to a remote device, such as a federated replica, which may involve high latency networking and perhaps cause the bottleneck to spread in a cascading fashion.

Furthermore, the storage manager may also prematurely take a hybrid drive out of service due to the SSD within the hybrid drive becoming more or less temporarily saturated. This may cause additional remedial activity, such as resilvering or other rebalancing, that is bandwidth intensive, time consuming, and even more likely to cause a cascading bottleneck.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Smart Flash Cache Logger |
| 3.0 | Flash Cache Logger Process |
| 4.0 | Unaligned Caching |
| 5.0 | Cache Index That Tracks Diversion |
| 5.1 | Chained Caches |
| 5.2 | Following Or Unwinding A Chain |
| 5.3 | Metadata Diversion |
| 5.4 | Bootstraping The Cache Index |
| 6.0 | Hardware Overview |
| 7.0 | Extensions and Alternatives |

1.0. General Overview

Techniques are described herein for chaining nonvolatile storage devices to achieve high availability. In an embodiment, a storage server receives a write request to persist data blocks. The storage server selects one of multiple nonvolatile storage devices to cache the data blocks in. If the selected nonvolatile storage device cannot timely process the write request, then the storage server selects an alternate nonvolatile storage device to reroute the write request to. The storage server also maintains a cache index of data blocks that are cached in the nonvolatile storage devices. When the storage server writes the data blocks into the alternate device, the storage server inserts into the cache index a new index entry with a compound key that has at least a storage device identifier and a storage offset. The value of the new entry has at least an identifier of a nonvolatile storage device, a nonvolatile memory offset, and a flag that indicates whether the associated data block was diverted to an alternate nonvolatile storage device. The storage server references the cache index to determine which nonvolatile storage device recorded the most recent write of the associated data block. A data block may be repeatedly diverted such that multiple versions of the data block are configured as links in a chain that spans multiple nonvolatile storage devices.

2.0 Smart Flash Cache Logger

Figure 1:
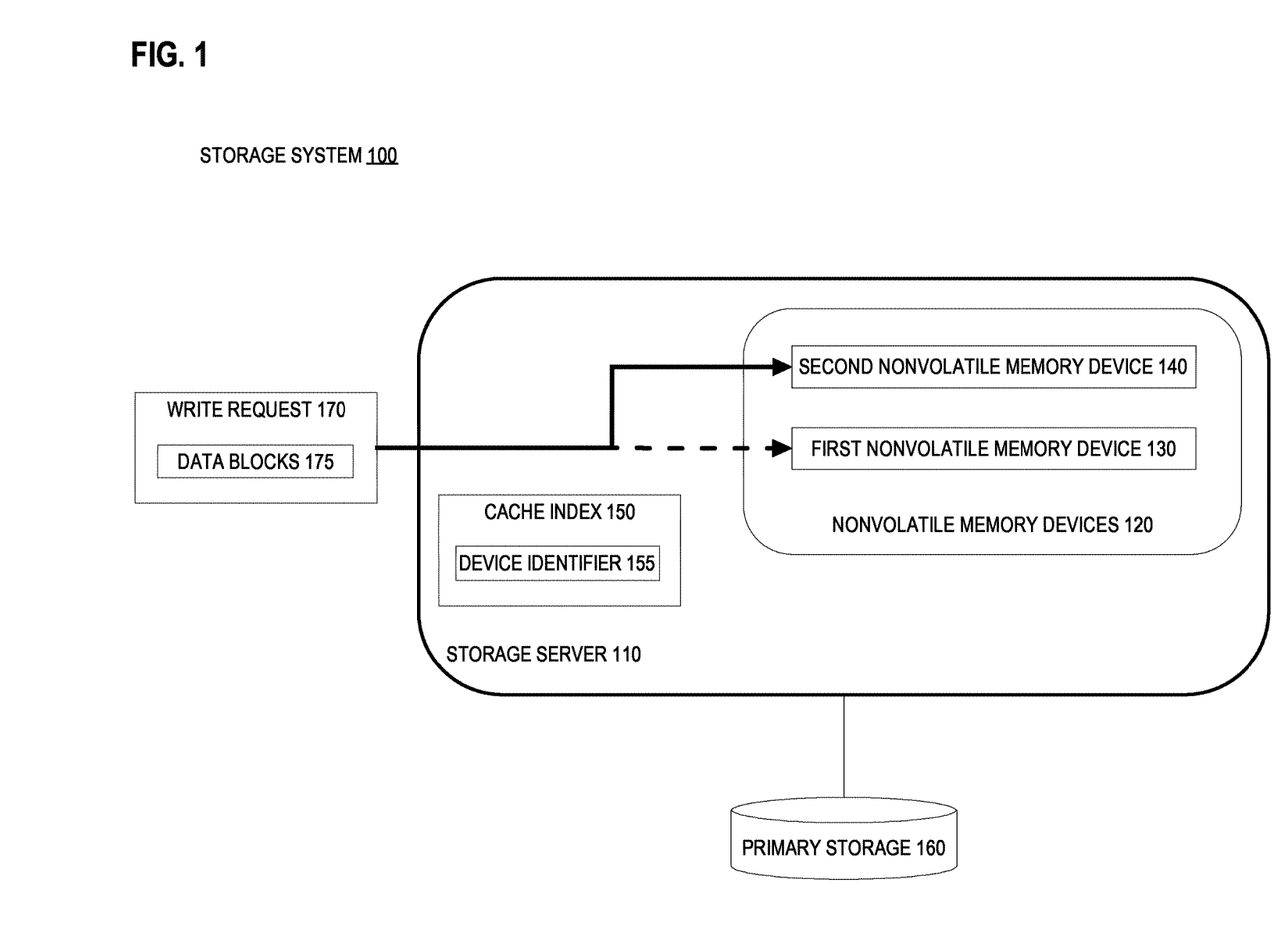
FIG. 1 is a logical block diagram illustrating an example storage system in which certain techniques described herein may be implemented, according to various embodiments.

FIG. 1 illustrates a block diagram of example storage system 100 that diverts a write request from a saturated or otherwise temporarily unavailable nonvolatile memory device to a ready nonvolatile memory device, in which techniques described herein may be practiced. Storage system 100 comprises storage server 110 and primary storage 160.

Primary storage 160 is a block storage device that stores data in logical data blocks of fixed size, such as 64-kilobytes. Primary storage 160 may be mechanical storage, such as a disk drive or tape drive. The recording medium of primary storage 160 may be magnetic or optic.

Primary storage 160 may be connected to storage server 110 over a shared backplane, such as a motherboard or server rack, or by optic or magnetic cable, such as InfiniBand, fibre channel, or other small computer system interface (SCSI). Primary storage 160 may be characterized by affordable hardware and high storage capacity, perhaps implemented with squeeze tracks or shingled magnetic recording. Primary storage 160 may also be characterized by high latency, compared to integrated circuitry, due to seek time or rotational latency.

Storage server 110 may be a rack server such as a blade, a personal computer, a storage appliance, or other computer that controls block storage devices. Storage server 110 has nonvolatile memory devices 120 that comprise a plurality of nonvolatile memory devices. Nonvolatile memory devices 120 durably store and retain data even when electrical power is interrupted. Nonvolatile memory devices 120 operate without mechanical motion and may be characterized as low latency, compared to mechanical storage.

Each of nonvolatile memory devices 120 is to comprise a floating gate flash memory for technological maturity, low cost, and commodity availability, however other nonvolatile memory technologies suffice. For example any of nonvolatile memory devices 120 may be a ferroelectric random access memory (RAM) for high endurance, low power, fast writes, and radiation hardness. For high density, any of nonvolatile memory devices 120 may be a magnetoresistive RAM, a phase change RAM, or a millipede memory.

Because of their low latency, storage server 110 operates each of nonvolatile storage devices 120 as a cache of data blocks that are stored on primary storage 160. As such, nonvolatile storage devices 120 may be involved when storage server 110 processes storage requests.

In operation, storage server 110 receives write request 170 that bears data blocks 175 to be persisted. Write request 170 may originate from a virtual storage manager or a database server. Write request 170 may be delivered to storage server 110 by a communication network or originate from an independent process within storage server 110.

Although data blocks 175 are intended for recording in primary storage 160, storage server 110 has cache management software that fulfils write request 170 by recording data blocks 175 in any of nonvolatile memory devices 120. Use of nonvolatile memory devices 120 by storage server 110 enables low latency even during a demand spike. Eventually storage server 110 may later record data blocks 175 to primary storage 160. Use of nonvolatile memory devices 120 by storage server 110 also enables repeated updates of data blocks 175 to be coalesced before recording on primary storage 160.

Although nonvolatile memory devices 120 is shown as having only first and second nonvolatile memory devices 130 and 140, nonvolatile memory devices 120 may have more nonvolatile memory devices. For various reasons, storage server 110 may fulfil write request 170 by recording data blocks 175 into a particular one of nonvolatile memory devices 120. For example, the prior version of data blocks 175 may already be pinned or otherwise reside in first nonvolatile memory device 130. Alternatively, data blocks 175 may not yet be cached, and first nonvolatile memory device 130 may be the least busy or most empty of nonvolatile memory devices 120.

For various reasons, an attempt to write data blocks 175 to first nonvolatile memory device 130 may be unsuccessful. For example, flash memory typically needs dynamic maintenance. First nonvolatile memory device 130 may be independently busy performing an erase cycle, bad block management, or read disturb avoidance. As such, execution of write request 170 may time out or otherwise fail. First nonvolatile memory device 130 may be overwhelmed with a backlog of demand. Storage server 110 may have a nearly exhausted buffer pool. Alternatively and for other reasons, storage server 110 may decide to cancel write request 170 that is pending processing by first nonvolatile memory device 130.

Whatever the reason, storage server 110 either proactively or reactively decides that writing data blocks 175 to first nonvolatile memory device 130 is infeasible. Storage server 110 compensates by rerouting write request 170 to second nonvolatile storage device 140.

Storage server 110 is responsible for tracking which of its nonvolatile memory devices 120 contain which data blocks. For this purpose, storage server 110 maintains cache index 150 as a data structure that correlates virtual block addresses with particular devices of nonvolatile memory devices 120 that cache those blocks. For example, cache index 150 may contain a device identifier 155 for each data block that is tracked by cache index 150.

For example cache index 150 may operate as a hash table that maps a primary storage device identifier and block address to a nonvolatile memory device identifier and memory offset. When storage server 110 diverts a write request by sending it to a particular nonvolatile memory device, storage server 110 stores into cache index 150 at least an identifier of the particular nonvolatile memory device and a memory offset of the written data blocks. This enables storage server 110 to route to the particular nonvolatile memory device any subsequent storage requests that involve those written data blocks.

3.0 Flash Cache Logger Process

Figure 2:
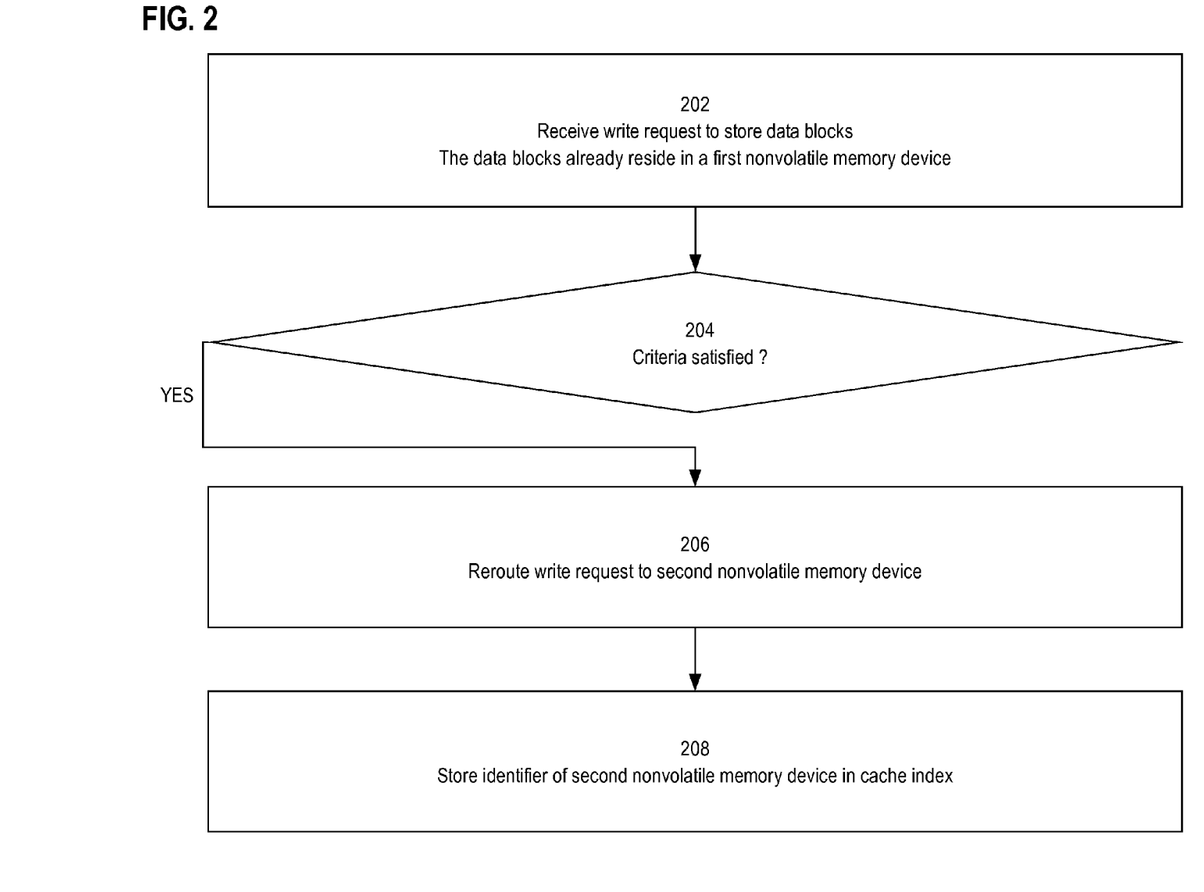
FIG. 2 illustrates an example process for diverting a write request to a nonvolatile memory, according to an embodiment.

FIG. 2 depicts a flow diagram of an example process for diverting a write request to a nonvolatile memory. For illustrative purposes, FIG. 2 is discussed in relation to FIG. 1.

Step 202 occurs during live operation. In step 202, a computer receives a write request. The request bears at least one data block to be stored. For example, write request 170 may originate over a communications network from a virtual storage manager or a database server. Write request 170 may identify a storage device, such as a disk drive or flash module that storage server 110 controls, as the intended storage destination of data blocks 175. Alternatively, write request 170 may bear a block address that storage system may use as a lookup key to determine a storage device according to cache index 150.

In step 204, criteria of a reroute condition may be satisfied. For example, storage server 110 may issue write request 170 to a storage device, such as a disk drive or flash module that write request 170 may identify and storage server 110 controls. The storage device may be unable to fulfil write request 170 on time or at all. Storage server 110 reactively detects such a problem and recognizes it as satisfying a reroute criterion. Alternatively and without issuing write request 170 to the storage device, storage server 110 may proactively assess the health or readiness of the storage device and determine that the storage device is unready. For example, storage server 110 may detect that a backlog of demand on the storage device is causing unacceptable latency. Storage server 110 recognizes such device stress as satisfying a reroute criterion.

In step 206, the write request is rerouted to another nonvolatile memory device. For example, storage server 110 has detected that reroute criteria are satisfied. Storage server 110 selects second nonvolatile memory device 140 as an immediate destination for storing data blocks 175. Storage server 110 writes data blocks 175 into second nonvolatile memory device 140.

In step 208, an identifier of the nonvolatile memory device that actually stored the data blocks is recorded in a cache index. For example, cache index 150 may reside in volatile RAM. Storage server 110 writes at least an identifier of second nonvolatile memory device 140 and the block addresses of data blocks 175 into cache index 150. As such, cache index 150 maintains an inventory of all data blocks stored in nonvolatile memory devices 120 and records which devices of nonvolatile memory devices 120 store which data blocks. Storage server 110 may consult cache index 150 when processing a subsequent storage command, whether a read or a write, to determine which of nonvolatile memory devices 120, if any, has data blocks that are implicated by the subsequent storage command.

Having durably cached data blocks 175 into second nonvolatile memory device 140, storage server 110 has fulfilled its immediate responsibility for write request 170 and may notify an originator of write request 170 that the request has been fulfilled. If data blocks 175 ultimately belong in another storage device that storage server 110 controls, such as primary storage 160, then storage server 110 may defer writing data blocks 175 to primary storage 160 until a later time that is convenient for storage server 110 and primary storage 160. That is, at the conclusion of step 208, data blocks 175 might not be stored in primary storage 160 as intended, but due to cache index 150 that tracks the location of data blocks 175, these blocks are durably stored nearby and publically accessible as though they were stored in primary storage 160.

4.0 Unaligned Caching

Figure 3:
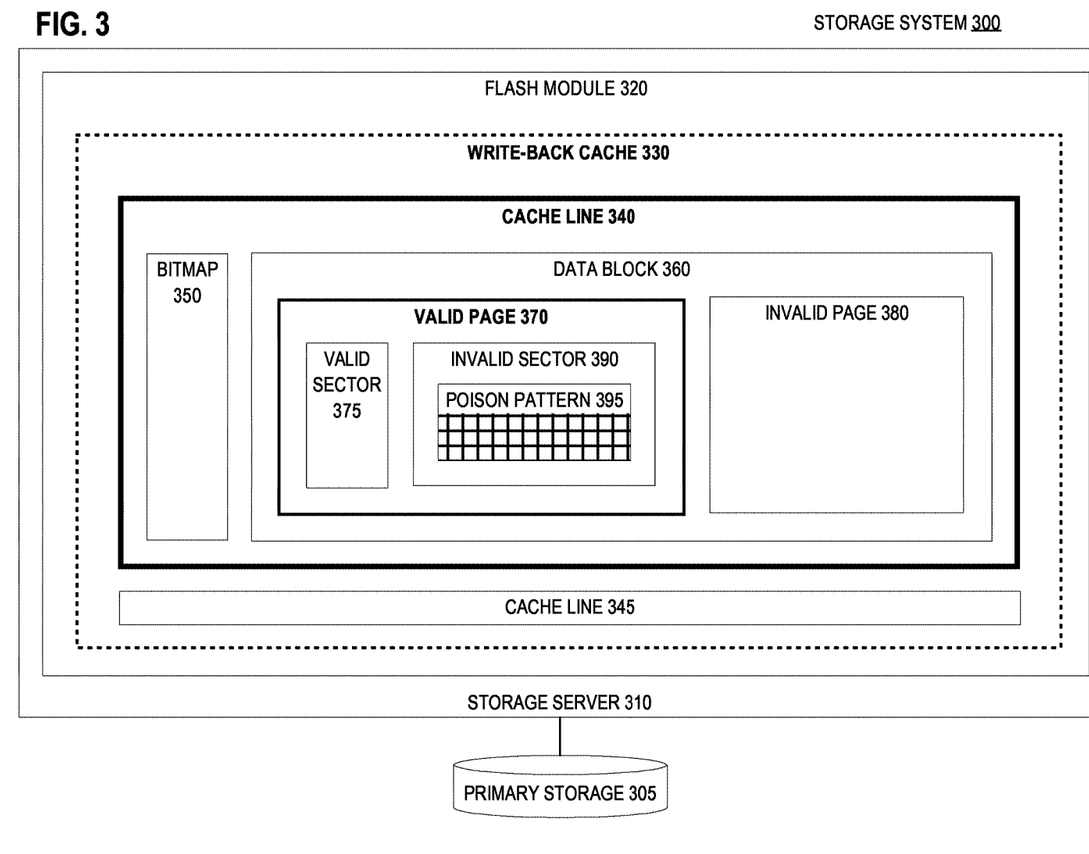
FIG. 3 is a logical block diagram illustrating an example storage system in which certain techniques described herein may be implemented, according to various embodiments.

FIG. 3 illustrates a block diagram of example storage system 300 that caches a fraction of a cache line, in which techniques described herein may be practiced. Storage system 300 may be an implementation of storage system 100. Storage system 300 includes storage server 310 and primary storage 305. Primary storage 305 may be an implementation of primary storage 160.

Storage server 310 may be an implementation of storage server 110. Storage server 310 includes flash module 320, which may be an implementation of one of nonvolatile memory devices 120. Flash module 320 includes write-back cache 340 that caches data blocks that may also reside in primary storage 305.

Write-back cache 330 is organized into cache lines, such as cache lines 340 and 345. A cache line is a unit of residency and eviction in write-back cache 330. For example, if write-back cache 330 is full but needs to store more data, then write-back cache 330 evicts a cache line to obtain space for the additional data.

Cached data is valid when it reflects the most recent write of that data. Valid cached data is dirty when it does not match the contents of primary storage 305, such as when primary storage 305 either lacks that data or has a stale copy of that data. Unlike a write-through cache, write-back cache 340 may store dirty data that does not match what resides in primary storage 305. For example, dirty data in write-back cache 340 may reflect a more recent update or may be entirely new data.

By eventually writing dirty cached data to primary storage 305, storage server 310 ensures that primary storage 305 has eventual consistency with write-back cache 330. Allowing write-back cache 330 to store dirty data reduces apparent write latency because writes can be acknowledged as complete before actually being written to primary storage 305.

A correspondence between a size of a cache line and a size of a data block depends on an implementation of write-back cache 330. In this example, each cache line is sized to store one data block and its accompanying metadata. Cache line 340 includes data block 360 and bitmap 350.

Although a cache line with its data block is the unit of eviction within write-back cache 330, write-back cache 330 may process a writing of a fraction of a data block. For example data block 360 may have 64 kilobytes of data, whereas a write request may involve much less data. Data block 360 may be comprised of four-kilobyte pages, such as valid page 370 and invalid page 380.

Cached data is invalid when it does not represent actual data. For example, if data is written to all of cache line 340, then all of cache line 340 is valid. However, if data is written to only half of cache line 340, then part of cache line 340 may be valid and another part of cache line 340 may be invalid.

If storage server 310 always loads data block 360 from primary storage 305 into cache line 340 as a preface to processing a subsequent write to any portion of cache line 340, then cache line 340 will always have valid data because it always has the latest contents of data block 360.

However, if a fraction of data block 360 is written to cache line 340 without first loading data block 360 into cache line 340 from primary storage 305, then cache line 340 becomes incoherent. As such and within cache line 340, the part of data block 360 that is written to would be valid and any other part of data block 360 would be invalid within cache line 340.

Cache line 340 has bitmap 350 to track which parts of data block 360 are valid within cache line 340. For example, data block 360 may be divided into pages, such as valid page 370 and invalid page 380. Each bit of bitmap 350 indicates validity or invalidity of a page within data block 360.

Storage server 310 may first load data block 360 into write-back cache 330 from primary storage 305 before processing a fractional write to data block 360. For example, if data block 360 is absent from write-back cache 330 when a request to write valid page 370 occurs, then storage server 310 may load data block 360 into cache line 340 from primary storage 305 as a preface to caching valid page 370.

However to reduce latency, storage server 310 may avoid loading data block 360 from primary storage 305 and instead directly write valid page 370 into cache line 340, mark valid page 370 as valid within bitmap 350, and mark the other pages of data block 360 as invalid within bitmap 350.

Furthermore, each page of data block 370 may be subdivided into 512-byte sectors. Because a data block has only 16 pages, bitmap 350 is small. However, each data block has 128 sectors, which might need too big a bitmap to indicate sector validity. Instead of having indications of sector validity centralized in bitmap 350, an invalid sector may bear within its own content an indication of invalidity. For example, invalid sector 390 is filled with poison pattern 395 that may consist of a repeating magic number or other reserved bit pattern.

Data block 360 may have a mix of valid and invalid pages and, within a valid page, data block 360 may have a mix of valid and invalid sectors, such as valid sector 375 and invalid sector 390. During a write back, storage server 310 does not overwrite a valid portion within primary storage 305 with the contents of an invalid portion from within write-back cache 330. An attempt to write partially valid data block 360 back into primary storage 305 may instead be specially processed. Storage server 310 may skip invalid portions of data when writing data from write-back cache 330 back to primary storage 305.

Storage system 300 may sometimes be incoherent, such as when different versions of data block 360 reside in primary storage 305 and in flash module 320. When this occurs, it is possible that neither version of data block 360 is entirely valid. For example, sector 375 may be valid in flash module 320, but invalid in primary storage 305. Likewise, sector 390 may be valid in primary storage 305, but invalid in flash module 320. Neither version of data block 360 is entirely valid, but bitmap 350 and poison pattern 395 enable storage system 300 to always locate a particular portion of data block 360 that is valid.

When neither flash module 320 nor primary storage 305 has an entirely valid version of data block 360, then it may be impossible to regain coherency by performing a single data transfer between flash module 320 and primary storage 305. Under such conditions, storage system 300 must perform at least two data transfers, including one transfer in each direction between flash module 320 and primary storage 305.

For example, storage system 300 may write valid sector 375 into primary storage 305. That write may cause data block 360 to become entirely valid within primary storage 305. Storage system 300 may then read data block 360 from primary storage 305 and write the retrieved content into cache line 340, thereby causing flash module 320 to also have a valid copy of data block 360. With those two transfers performed by storage system 300, the contents of data block 360 are identical in primary storage 305 and flash module 320. Hence, storage system 300 has regained coherency with regards to data block 360.

5.0 Cache Index that Tracks Diversion

Figure 4:
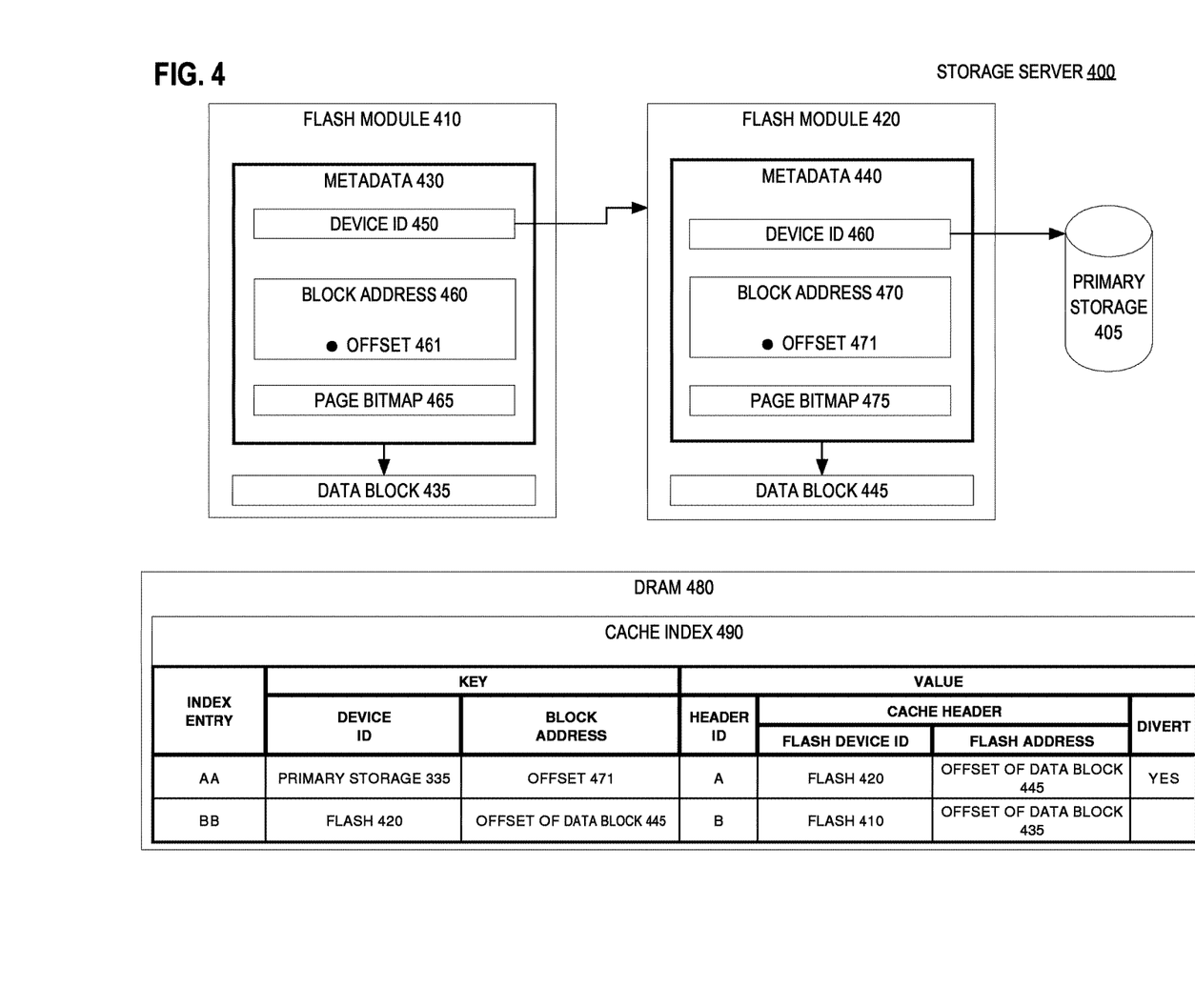
FIG. 4 is a logical block diagram illustrating an example storage server in which certain techniques described herein may be implemented, according to various embodiments.

FIG. 4 illustrates a block diagram of example storage server 400 that logically chains nonvolatile storage devices to achieve high availability, in which techniques described herein may be practiced. Storage server 400 may be an implementation of storage server 110. Storage server 400 includes flashes 410 and 420. Each of flash modules 410 and 420 may be an implementation of one of nonvolatile memory devices 120. Although this example uses flash modules, an embodiment may instead use other nonvolatile memory technologies, such as those already discussed herein.

Each of flashes 410 and 420 may store data blocks and metadata about those data blocks. For example, flash module 420 stores data block 445 and metadata 440 that is associated with data block 445. Metadata 440 includes device identifier 460, block address 470, and page bitmap 475. Device identifier 460 contains the value of a device identifier of primary storage 405. Block address 470 contains the value of storage offset 471 that virtually, logically, or physically identifies a data block within primary storage 405. As shown in FIG. 4, the direction of arrows emerging from device identifiers 450 and 460 indicate referential indirection rather than dependency. Dependency between devices also occurs along those arrows, but in the reverse direction.

While data block 445 resides in flash module 420, subsequent reads and writes should be routed to flash module 420. To facilitate this, storage server 400 maintains cache index 490 that indicates which flash modules store which data blocks. To minimize index latency, storage server 400 includes fast dynamic RAM (DRAM) 480 as a container of cache index 490. DRAM 480 may optionally be a very fast RAM, such as a static RAM.

Upon storing data block 445 in flash module 420 for a first time, storage server 400 writes metadata 440 to durably associate data block 445 with primary storage 405. Also during an initial write of data block 445, storage server 400 inserts index entry AA into cache index 490. Index entry AA functions as a marker that indicates that subsequent reads and writes of data block 445 should be directed to flash module 420.

Details shown in FIG. 4 for cache index 490 are logical in nature and do not necessarily represent any particular data structure. In an embodiment, cache 490 operates as a hash table that maps keys to values. A key is compound, such that it comprises at least a device identifier and a block address. For example, a request to read or write a data block may bear a device identifier of primary storage 405 and an associated storage offset, which storage server 400 may use as a key to retrieve an index entry from cache index 490. The value of an index entry has a cache header that indicates which cache line of which flash module is caching an associated data block.

When processing a subsequent write of data block 445, storage server 400 consults cache index 490 to determine that the write should be coalesced with other writes to data block 445 and stored within flash module 420. However perhaps due to busyness or unhealthiness, flash module 420 may be unable to timely handle a subsequent write. Storage server 400 detects this problem and compensates with special processing to divert the subsequent write away from flash module 420.

This special processing begins by flagging as "YES", within index entry AA, that data block 445 is diverted. Storage server 400 selects an alternate flash module, such as flash module 410, to accommodate the write. Storage server 400 writes the incoming data block into flash module 410, shown as data block 435. Data block 435 is a more recent version of data block 445. Storage server 400 also writes metadata 430 into flash module 410 to durably document that data block 435 was diverted from flash module 420.

Finally, storage server 400 inserts index entry BB into cache index 490 to track that data block 435 resides in flash module 410. The key of index entry BB indicates from where data block 445 was diverted. As such, the compound key of index entry BB includes a device identifier of flash module 420 and a flash offset of data block 445. The cache header of index entry BB indicates to where data block 445 was diverted. As such, the cache header of index entry BB includes a device identifier of flash module 410 and a flash offset of data block 435.

5.1 Chained Caches

Flashes 410 and 420 are chained because device identifier 450 within flash module 410 designates flash module 420. A chain of flash modules may include some or all of the flash modules that storage server 400 has, which may include more flash modules than shown. As such, a longer chain than shown is possible.

Furthermore, a cache line is the unit of diversion, rather than treating an entire flash module as diverted. As such, diversion of a data block away from a flash module does not take the flash module out of service. For example even though data block 445 is diverted away from flash module 420, still flash module 420 may continue to process reads and writes for other data blocks, perhaps because flash module 420 soon clears a backlog or otherwise regains spare bandwidth. As such, flash module 420 may contain a mix of some data blocks that are diverted and others that are not and remain active within flash module 420.

Such a mixture of data blocks may emerge when flash module 420 is briefly overwhelmed by a demand spike that causes data block 445 to be diverted away from flash module 420. At the moment flash module 420 recovers from the demand spike, flash module 420 may resume processing requests for other data blocks. However, some more time may elapse before diversion of data block 445 stops, especially if undoing the diversion entails unwinding a long chain.

5.2 Following or Unwinding a Chain

As explained above, versions of a data block may be chained across different caches. However also as explained above, a cache line may be only partially valid. When the most recent link of a chain has only a partial data block, a subsequent read should follow the chain to gather pieces of the data block and then reassemble these pieces into a whole data block that may be returned to a client. Assuming that a network storage infrastructure includes federation and replication, if a flash module in the chain is nonresponsive during a read that follows the chain, then the read should be locally failed to cause reissue to a remote replica.

Likewise when storage server 400 decides to cease diversion of a data block, storage server 400 should unwind the chain. Unwinding includes following the chain to gather and reassemble pieces as with a read request. However, unwinding includes additional processing. For example with unwinding, the goal is to undo any diversion of a particular data block that occurred.

As such, storage server 400 writes the reassembled data block back into the original cache line that holds the oldest version of the data block. Other cache lines that hold other versions of the data block are immediately evicted or at least invalidated, which includes removal of all but the oldest index entry in cache index 490 for that data block.

Unwinding the chain also entails discarding data block 435 and metadata 430 from flash module 410 and removing index entry BB from cache index 490. Finally, unwinding the chain includes clearing the "YES" flag in index entry AA that marked data block 445 as diverted.

5.3 Metadata Diversion

Although the example in FIG. 4 shows diversion of a data block, storage server 400 may also divert metadata. That is, a data block and its associated metadata are atomically separate units of data, which enables diversion of metadata and associated data blocks to occur independently. As such and although not shown, a data block and its associated metadata each may have a separate index entry within cache 490. As such, metadata may be diverted without diversion of its associated data block. Likewise, metadata and its associated data block may be diverted to separate flash modules.

5.4 Bootstrapping the Cache Index

Because cache index 490 resides in volatile DRAM 480, cache index 490 is lost when storage server 400 is powered off. When storage server 400 is rebooted, it rebuilds cache index 490 before accepting storage requests. To rebuild cache index 490 and assuming that storage server 400 has the ability to recognize cached metadata, storage server 400 scans flashes 410 and 420 for durable metadata, such as metadata 430 and 440.

For example, storage server 400 may scan flash module 410 and discover metadata 430. Storage server 400 detects that metadata 430 has device identifier 450 that refers to a different flash module, which is flash module 420. This causes storage server 400 to recognize that flash module 410 depends on flash module 420. As such storage server 400 may decide to instead scan and process flash module 420 before restarting the scanning of flash module 410.

Alternatively if storage server 400 is not configured to discover cached metadata, then storage server 400 may be assisted by a central repository that functions as a master directory of cached metadata. In either case, storage server 400 bootstraps its flash modules in an ordering according to a dependency graph of diversion chains. Storage server 400 may traverse the interdependencies between flash modules in a depth first search ordering during which storage server 400 rebuilds cache index 490 and patches cached stale metadata if needed.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
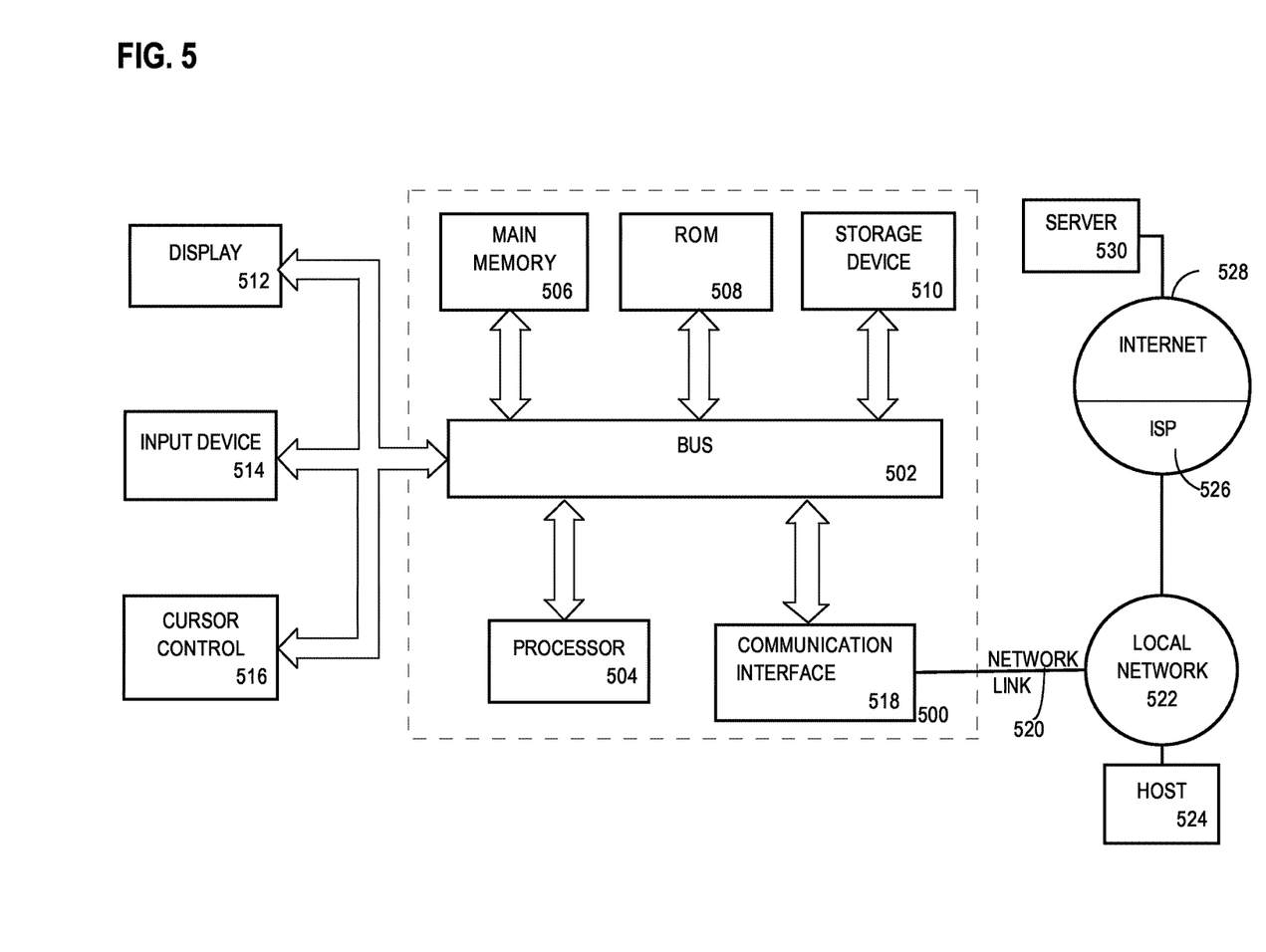
FIG. 5 is a block diagram illustrating one embodiment of a computer system suitable for implementing methods and features described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a light emitting diode (LED) display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
  a storage server receiving a write request to store particular data blocks, wherein:
   the storage server comprises a plurality of nonvolatile memory devices,
   each nonvolatile memory device of the plurality of nonvolatile memory devices caches a plurality of data blocks that are or will be stored on primary storage consisting essentially of block storage devices,
   the particular data blocks reside in a first nonvolatile memory device of the plurality of nonvolatile memory devices,
   the storage server maintains a cache index of data blocks that reside in the plurality of nonvolatile memory devices, and
   the cache index contains a first index entry that contains an identifier of the first nonvolatile memory device and an identifier of a specific data block of the particular data blocks;
  detecting, responsive to receiving the write request, a status of the first nonvolatile memory device;
  based on detecting the status of the first nonvolatile memory device, the storage server:

rerouting the write request to a second nonvolatile memory device of the plurality of nonvolatile memory devices,
inserting a second index entry that contains an identifier of the second nonvolatile memory device and said identifier of the specific data block, and
marking said first index entry as diverted;
removing said second index entry from the cache index;
marking said first index entry as not diverted.

2. The method of claim 1 wherein the second nonvolatile memory device comprises a write-back cache, wherein the write-back cache comprises a plurality of cache lines.

3. The method of claim 2 wherein each cache line of the plurality of cache lines is associated with a bitmap that indicates which portions of the each cache line are valid.

4. The method of claim 2 wherein a specific pattern residing in a portion of one of the plurality of cache lines indicates that the portion is invalid.

5. The method of claim 1 wherein based on the status of the first nonvolatile memory device comprises based on the write request being cancelled.

6. The method of claim 1 wherein the second nonvolatile memory device comprises a flash memory.

7. The method of claim 1 wherein the second nonvolatile memory device comprises one of: a ferroelectric random access memory (RAM), a magnetoresistive RAM, a phase change RAM, or a millipede memory.

8. The method of claim 1 further comprising based on metadata associated with cached blocks that reside in the plurality of nonvolatile memory devices, generating the cache index, wherein the metadata resides on one or more storage devices.

9. The method of claim 8 further comprising booting a plurality of storage computers in an ordering based on dependencies encoded within the metadata.

10. The method of claim 1 wherein based on the status of the first nonvolatile memory device comprises the write request times out when the storage server delivers the write request to the first nonvolatile memory device.

11. The method of claim 1 further comprising:
the storage server receiving a metadata write request to store metadata in a nonvolatile memory device;
based on one or more criteria, the storage server:
rerouting the metadata write request to a third nonvolatile memory device of the plurality of nonvolatile memory devices;
storing an identifier of the third nonvolatile memory device in the cache index.

12. One or more non-transitory computer readable media comprising instructions that when executed by one or more processors cause:
a storage server receiving a write request to store particular data blocks, wherein:
the storage server comprises a plurality of nonvolatile memory devices,
each nonvolatile memory device of the plurality of nonvolatile memory devices caches a plurality of data blocks that are or will be stored on primary storage consisting essentially of block storage devices,
the particular data blocks reside in a first nonvolatile memory device of the plurality of nonvolatile memory devices,
the storage server maintains a cache index of data blocks that reside in the plurality of nonvolatile memory devices, and
the cache index contains a first index entry that contains an identifier of the first nonvolatile memory device and an identifier of a specific data block of the particular data blocks;
detecting, responsive to receiving the write request, a status of the first nonvolatile memory device;
based on detecting the status of the first nonvolatile memory device, the storage server:
rerouting the write request to a second nonvolatile memory device of the plurality of nonvolatile memory devices,
inserting a second index entry that contains an identifier of the second nonvolatile memory device and said identifier of the specific data block, and
marking said first index entry as diverted;
removing said second index entry from the cache index;
marking said first index entry as not diverted.

13. The one or more non-transitory computer readable media of claim 12 wherein the second nonvolatile memory device comprises a write-back cache, wherein the write-back cache comprises a plurality of cache lines.

14. The one or more non-transitory computer readable media of claim 13 wherein each cache line of the plurality of cache lines is associated with a bitmap that indicates which portions of the each cache line are valid.

15. The one or more non-transitory computer readable media of claim 13 wherein a specific pattern residing in a portion of one of the plurality of cache lines indicates that the portion is invalid.

16. The one or more non-transitory computer readable media of claim 13 wherein based on the status of the first nonvolatile memory device comprises based on the write request being cancelled.

17. The one or more non-transitory computer readable media of claim 12 wherein the second nonvolatile memory device comprises one of: a flash memory, a ferroelectric random access memory (RAM), a magnetoresistive RAM, a phase change RAM, or a millipede memory.

18. A storage server comprising:
a primary storage configured to store data blocks;
a plurality of nonvolatile memory devices configured to cache data blocks that are stored on the primary storage; and
a processor, connected to the primary storage and the plurality of nonvolatile memory devices, wherein the processor is configured to:
receive a write request to store particular data blocks, wherein:
the storage server comprises a plurality of nonvolatile memory devices,
each nonvolatile memory device of the plurality of nonvolatile memory devices caches a plurality of data blocks that are or will be stored on primary storage consisting essentially of block storage devices,
the particular data blocks reside in a first nonvolatile memory device of the plurality of nonvolatile memory devices,
the storage server maintains a cache index of data blocks that reside in the plurality of nonvolatile memory devices, and
the cache index contains a first index entry that contains an identifier of the first nonvolatile memory device and an identifier of a specific data block of the particular data blocks;
detecting, responsive to receiving the write request, a status of the first nonvolatile memory device;

based on detecting the status of the first nonvolatile memory device, the storage server:
  rerouting the write request to a second nonvolatile memory device of the plurality of nonvolatile memory devices,
  inserting a second index entry that contains an identifier of the second nonvolatile memory device and said identifier of the specific data block, and
  mark said first index entry as diverted;
removing said second index entry from the cache index;
marking said first index entry as not diverted.

19. The system of claim 18 wherein the second nonvolatile memory device comprises at least one of: a flash memory or a write-back cache, wherein the write-back cache comprises a plurality of cache lines.

20. The system of claim 18 wherein based on the status of the first nonvolatile memory device comprises based on the write request timing out when a processor delivers the write request to the first nonvolatile memory device.

21. The method of claim 1 further comprising:
the storage server receiving a read request to retrieve at least one data block of said particular data blocks;
accessing said first index entry and said second index entry to retrieve said at least one data block.

22. The method of claim 1 further comprising:
the storage server receiving a second write request to store said particular data blocks;
detecting, responsive to receiving the second write request, a second status of the second nonvolatile memory device;
based on detecting the second status of the second nonvolatile memory device, the storage server:
  rerouting the second write request to a third nonvolatile memory device of the plurality of nonvolatile memory devices; and
  for each data block of the particular data blocks:
    inserting a third index entry that contains an identifier of the third nonvolatile memory device and an identifier of the data block in the cache index, and
    marking, as diverted to the third nonvolatile memory device, said second index entry in the cache index.

23. The method of claim 1 further comprising:
the storage server receiving a read request to retrieve a specific data block of said particular data blocks;
retrieving a first portion of said specific data block from said first nonvolatile memory device;
retrieving a second portion of said specific data block from said second nonvolatile memory device.

* * * * *

UNITED STATES PATENT AND TRADEMARK OFFICE
CERTIFICATE OF CORRECTION

PATENT NO. : 10,152,412 B2  
APPLICATION NO. : 14/794107  
DATED : December 11, 2018  
INVENTOR(S) : Aya et al.

Page 1 of 1

It is certified that error appears in the above-identified patent and that said Letters Patent is hereby corrected as shown below:

In the Specification

In Column 2, Line 18, delete "Bootstraping" and insert -- Bootstrapping --, therefor.

In the Claims

In Column 15, Line 13, in Claim 19, delete "system" and insert -- storage server --, therefor.

In Column 15, Line 16, in Claim 20, delete "system" and insert -- storage server --, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*